United States Patent
Sugiyama et al.

(10) Patent No.: US 9,789,672 B2
(45) Date of Patent: Oct. 17, 2017

(54) SYSTEM FOR JOINING RESIN AND METAL

(71) Applicant: TOYOTA JIDOSHA KABUSHIKI KAISHA, Toyota-shi (JP)

(72) Inventors: Toru Sugiyama, Aichi-ken (JP); Yoshinori Shibata, Aichi-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 254 days.

(21) Appl. No.: 14/644,744

(22) Filed: Mar. 11, 2015

(65) Prior Publication Data
US 2015/0210051 A1 Jul. 30, 2015

Related U.S. Application Data

(62) Division of application No. 13/059,907, filed as application No. PCT/IB2009/006454 on Aug. 4, 2009, now Pat. No. 9,005,388.

(30) Foreign Application Priority Data

Aug. 19, 2008 (JP) ................................. 2008-211081

(51) Int. Cl.
*B29C 65/46* (2006.01)
*B29C 65/44* (2006.01)
(Continued)

(52) U.S. Cl.
CPC .......... *B32B 37/06* (2013.01); *B29C 65/1635* (2013.01); *B29C 65/1683* (2013.01);
(Continued)

(58) Field of Classification Search
None
See application file for complete search history.

(56) References Cited

U.S. PATENT DOCUMENTS 3,725,169 A 4/1973 Allen et al.
3,749,621 A 7/1973 Shoffner
(Continued)

FOREIGN PATENT DOCUMENTS

DE         39 32 294 C1    11/1990
DE   10 2004 04862       4/2006
(Continued)

OTHER PUBLICATIONS

Salinas, "Untersuchung Fluechitger Verbindungen Bei Der Thermischen Zersetzung Von Stickstoffhaltigen Polymerwerkstoffen," Lehrstuhl Fuer Oekologische Chemie Und Umweltanalytik Der Technischen Universitaet Muenchen, Dissertation, pp. 1-166 (Dec. 27, 2000).

(Continued)

*Primary Examiner* — Barbara J Musser
(74) *Attorney, Agent, or Firm* — Oblon, McClelland, Maier & Neustadt, L.L.P.

(57) ABSTRACT

A joining method for joining a resin member and a metal member by heating is provided. Joining of the resin member and metal member is performed by heating a joining interface of the resin member and metal member to a temperature in a range of equal to or higher than a decomposition temperature of the resin member and lower than a temperature at which gas bubbles are generated in the resin member and by cooling a surface of the resin member on the opposite side from a joining surface thereof with the metal member to a temperature that is lower than the melting point of the resin member.

4 Claims, 7 Drawing Sheets

(51) Int. Cl.
  *B32B 37/06* (2006.01)
  *B29C 65/16* (2006.01)
  *B32B 37/00* (2006.01)
  *B32B 37/04* (2006.01)
  *B32B 37/08* (2006.01)
  *B29C 65/18* (2006.01)
  *B29C 65/00* (2006.01)
  *B29K 305/00* (2006.01)
  *B29K 305/02* (2006.01)
  *B29K 305/10* (2006.01)
  *B29K 305/12* (2006.01)
  *B29L 31/00* (2006.01)
  *B29C 65/08* (2006.01)
  *B29C 65/10* (2006.01)
  *B29C 65/14* (2006.01)
  *B29C 65/30* (2006.01)
  *B29C 65/32* (2006.01)
  *B29C 65/36* (2006.01)
  *B29C 65/72* (2006.01)
  *B29C 65/06* (2006.01)

(52) U.S. Cl.
  CPC ...... *B29C 65/3656* (2013.01); *B29C 65/3676* (2013.01); *B29C 65/44* (2013.01); *B29C 65/46* (2013.01); *B29C 66/028* (2013.01); *B29C 66/02245* (2013.01); *B29C 66/1122* (2013.01); *B29C 66/21* (2013.01); *B29C 66/30322* (2013.01); *B29C 66/30325* (2013.01); *B29C 66/342* (2013.01); *B29C 66/348* (2013.01); *B29C 66/3474* (2013.01); *B29C 66/3492* (2013.01); *B29C 66/41* (2013.01); *B29C 66/43* (2013.01); *B29C 66/7392* (2013.01); *B29C 66/742* (2013.01); *B29C 66/81419* (2013.01); *B29C 66/81811* (2013.01); *B29C 66/83413* (2013.01); *B29C 66/91413* (2013.01); *B29C 66/91423* (2013.01); *B29C 66/91443* (2013.01); *B29C 66/91921* (2013.01); *B29C 66/91933* (2013.01); *B29C 66/91935* (2013.01); *B29C 66/91951* (2013.01); *B32B 37/0046* (2013.01); *B32B 37/04* (2013.01); *B32B 37/08* (2013.01); *B29C 65/06* (2013.01); *B29C 65/08* (2013.01); *B29C 65/10* (2013.01); *B29C 65/1412* (2013.01); *B29C 65/168* (2013.01); *B29C 65/18* (2013.01); *B29C 65/30* (2013.01); *B29C 65/32* (2013.01); *B29C 65/3644* (2013.01); *B29C 65/72* (2013.01); *B29C 66/02242* (2013.01); *B29C 66/45* (2013.01); *B29C 66/71* (2013.01); *B29C 2791/009* (2013.01); *B29C 2793/0036* (2013.01); *B29C 2793/0045* (2013.01); *B29C 2793/0054* (2013.01); *B29C 2793/0081* (2013.01); *B29K 2305/00* (2013.01); *B29K 2305/02* (2013.01); *B29K 2305/10* (2013.01); *B29K 2305/12* (2013.01); *B29L 2031/737* (2013.01); *B29L 2031/7374* (2013.01); *B32B 2605/08* (2013.01); *Y10T 156/1028* (2015.01)

(56) References Cited

U.S. PATENT DOCUMENTS

| | | | |
|---|---|---|---|
| 4,959,522 A * | 9/1990 | Rossi | B23K 26/06 219/121.63 |
| 4,988,400 A | 1/1991 | Rundo | |
| 5,342,464 A | 8/1994 | McIntire et al. | |
| 2005/0042456 A1 | 2/2005 | Krause et al. | |
| 2006/0049173 A1 * | 3/2006 | Gertitschke | B29C 66/91431 219/528 |
| 2009/0252978 A1 | 10/2009 | Katayama et al. | |

FOREIGN PATENT DOCUMENTS

| | | |
|---|---|---|
| EP | 0 628 399 | 12/1994 |
| EP | 1 508 398 | 2/2005 |
| EP | 1 920 906 | 5/2008 |
| JP | 05-185521 | 7/1993 |
| JP | 06-296073 | 10/1994 |
| JP | 07-205297 | 8/1995 |
| JP | 08-238676 | 9/1996 |
| JP | 09-295348 | 11/1997 |
| JP | 2000-67218 A | 3/2000 |
| JP | 2002-067218 | 3/2002 |
| JP | 2002-086055 | 3/2002 |
| JP | 2002-086612 | 3/2002 |
| JP | 2002-105664 | 4/2002 |
| JP | 2003-025450 | 1/2003 |
| JP | 2005-007415 | 1/2005 |
| JP | 2005-088355 | 4/2005 |
| JP | 2008-162288 | 7/2008 |
| JP | 2006-015405 | 1/2009 |
| KR | 2003-0009759 A | 2/2003 |

OTHER PUBLICATIONS

International Search Report issued in PCT/IB09/006454 dated Dec. 29, 2009.
Office Action issued in Japanese Patent Application No. 2008-211081 dated Jul. 29, 2010 (w/ partial English translation).
Office Action issued in Korean Patent Application No. 10-2011-7003468 dated Oct. 8, 2012 (w/ English translation).
Office Action issued in European Application No. 09 786 104.1 dated Dec. 1, 2014.

* cited by examiner

SYSTEM FOR JOINING RESIN AND METAL

CROSS-REFERENCE TO RELATED APPLICATIONS

This application is a division of U.S. application Ser. No. 13/059,907 filed Feb. 18, 2011, the entire contents of which is incorporated herein by reference. U.S. application Ser. No. 13/059,907 is a national stage of PCT/IB09/006454 filed Aug. 4, 2009, which is based upon and claims the benefit of priority from Japanese Application No. 2008-211081 filed Aug. 19, 2008.

BACKGROUND OF THE INVENTION

1. Field of the Invention

The invention relates to a joining method and a joining apparatus for joining a resin and a metal by heating.

2. Description of the Related Art

Resin members and metal members are usually joined together by using an adhesive, but in order to simplify the joining process and comply with the Volatile Organic Compounds (VOC) regulations, physical concavities and convexities are formed on the joining surface of the metal member with the resin member or chemical functional groups are modified by performing surface treatment such as acid or alkali treatment or a primer treatment, or a joint body of a resin and a metal is obtained by conducting insert molding of a thermoplastic resin on the joining surface of the metal member with the resin member.

In a case where a metal member and a resin member are joined together by a process in which, as mentioned above, the joining surface of the metal member with the resin member is subjected to a surface treatment, although no adhesive is used, a large amount of surface treatment agent such as an acid, an alkali, or a primer treatment agent is used and, therefore, when the spent surface treatment agent is discarded, environmental load is created. In addition, the surface-treated metal member has to be cleaned and dried, and a long time is required for the cleaning and drying operations. As a result, the aforementioned process is unsuitable for parts that require high productivity, such as automotive parts or the like. A problem associated with a process in which a metal member and a resin member are joined by insert molding a thermoplastic resin on the metal member, is that limitations are placed on the shape of the joint body.

Accordingly, for example, Japanese Patent Application Publication No. 5-185521 (JP-A-5-185521) describes a method for joining a resin member and a metal member within a short period by a simple process without using an adhesive or a surface treatment agent and without creating environmental load, wherein the resin member is joined to the metal member by heating and melting.

In a case where the resin member is heated, as mentioned hereinabove, to a melting temperature or softening temperature, the softened resin member deforms according to concavities and convexities of the metal member surface and the two members are joined by the anchor effect demonstrated due to such deformation, but a sufficient joining strength cannot be obtained in joining by the anchor effect alone. Furthermore, the resin member is heated by a hot atmosphere inside an oven or with a heater, but if the heating temperature is too high, gas bubbles are generated inside the resin and these bubbles cause crack generation in the resin member after joining. In addition, where the entire resin member is heated, the resin member is entirely melted and design properties of the outer surface of the resin member are lost. The resultant problem is that the application range of the joint of the resin member and metal member is limited.

SUMMARY OF THE INVENTION

The invention provides a joining method and a joining apparatus for a resin and a metal by which a resin member and a metal member are joined within a short period by a simple process, without creating environmental load, a sufficient joining strength can be obtained, and design properties of the outer surface of the resin member are not degraded.

The first aspect of the invention relates to a joining method for joining a resin and a metal by heating. By this joining method, the joining of the resin and the metal is performed by heating a joining interface of the resin and the metal to a temperature in a range of equal to or higher than a decomposition temperature of the resin and lower than a temperature at which gas bubbles are generated in the resin. With such a joining method, no surface treatment agent is used, a necessary and sufficient joining strength may be obtained within a short time, and environmental load in the process of joining the resin and metal may be reduced. Further, the occurrence of cracks that originate from gas bubbles at the joining interface of the resin and metal may be prevented after the joining of the resin and metal, and the joining strength of the resin and metal may be ensured.

In the joining method according to the abovementioned aspect, the joining interface of the resin and metal is heated from a surface of the metal on the opposite side from a joining surface thereof with the resin, and a surface of the resin on the opposite side from a joining surface thereof with the metal is cooled to a temperature that is lower than a melting point of the resin. With such a joining method, no surface treatment agent is used, a necessary and sufficient joining strength may be obtained within a short time, and environmental load in the process of joining the resin and metal may be reduced. Further, because the joining of the resin and metal is performed, while preventing the resin from thermal deformation during joining of the resin and metal, the design property of the external surface of the joint body of the resin and metal on the side of the resin is not reduced and the product value of the joint body may be increased.

In the joining method according to the abovementioned aspect, the joining of the resin and metal is performed by interposing a thin film having an electric resistance higher than that of the metal in the interface of the resin and metal and high-frequency heating the thin film from a surface of the resin on the opposite side from a joining surface thereof with the metal. As a result, even when the metal is constituted by a material with a high thermal conductivity and a low electric resistance, the efficiency of heat input to the joining region of the metal and resin may be increased, the joining interface of the metal and resin may be adequately heated for joining by a simple process and within a short time, and a sufficient joining strength may be obtained.

Further, in the joining method according to the abovementioned aspect, a thin film having a laser reflectance lower than that of the metal is interposed in the interface of the resin and metal, the resin is constituted by a material that can transmit laser radiation, and the joining of the resin and metal is performed by emitting laser radiation toward the thin film from a surface of the resin on the opposite side from a joining surface thereof with the metal and heating the thin film. As a result, even when the metal has a high reflectance of laser radiation, the efficiency of heat input to the joining region of the metal and resin may be increased, the joining interface of the metal and resin may be adequately heated for joining by a simple process and within a short time, and a sufficient joining strength may be obtained.

Further, in the joining method according to the above-mentioned aspect, a concavity into which the heated resin can penetrate is formed in a zone of the metal around a joining region of the resin and metal. As a result, the softened resin penetrates inside the concavity and an anchor effect is produced when the metal and resin are joined, thereby making it possible to increase the joining strength of the metal and resin after joining.

The second aspect of the invention relates to a joining apparatus that is used when a resin and a metal are joined by heating. The joining apparatus includes a heating tool that heats a joining interface of the resin and the metal from a surface of the metal on the opposite side from a joining surface thereof with the resin, and a cooling tool that cools a surface of the resin on the opposite side from a joining surface thereof with the metal to a temperature that is lower than a melting point of the resin. With such a configuration, a necessary and sufficient joining strength may be obtained within a short time and environmental load in the process of joining the resin and metal may be reduced without using a surface treatment agent. Further, because the joining of the resin and metal may be performed, while preventing the resin from thermal deformation during joining of the resin and metal, the product value of the joint body may be increased, without reducing the design property of the external surface of the joint body of the resin and metal on the side of the resin.

Further, in the joining apparatus according to the above-mentioned aspect, the heating tool heats the joining interface of the resin and metal to a temperature in a range of equal to or higher than a decomposition temperature of the resin and lower than a temperature at which gas bubbles are generated in the resin. With such configuration, no surface treatment agent is used, a necessary and sufficient joining strength may be obtained within a short time, and environmental load in the process of joining the resin and metal may be reduced. Further, the occurrence of cracks that originate from gas bubbles at the joining interface of the resin and metal may be prevented, and the joining strength of the resin and metal may be ensured.

In accordance with the invention, no surface treatment agent is used, a necessary and sufficient joining strength may be obtained within a short time, and environmental load in the process of joining the resin and metal may be reduced.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the invention will be described below with reference to the appended drawings.

Figure 1:
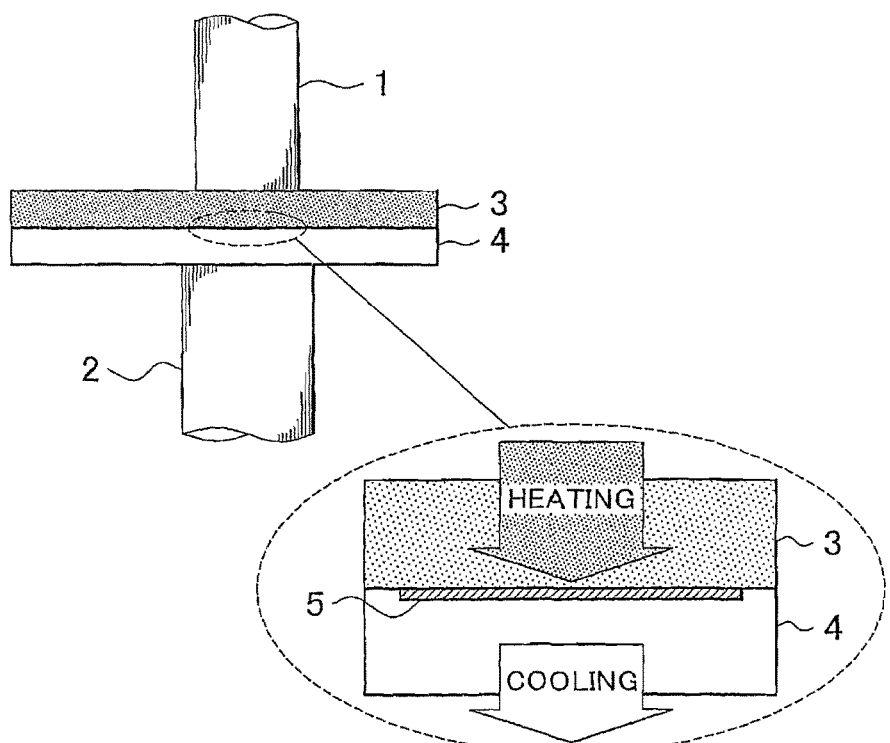
FIG. 1 is a side view illustrating how a metal member and a resin member are joined together by using a joining apparatus including a heating body and a cooling body.

As shown in FIG. 1, in a joining method of the present embodiment in which a resin member 4 and a metal member 3 are joined together, in a state in which the resin member 4 and metal member 3 are stacked, the two are joined by heating a joining interface of the resin member 4 and metal member 3 to a predetermined temperature with a heating body 1, which is a heating tool.

More specifically, for example, the joining interface of the resin member 4 and metal member 3 is heated by bringing the heating body 1 into contact with the surface of the metal member 3 on the opposite side from the joining surface thereof with the resin member 4. Further, the heating with the heating body 1 is conducted so that the joining surface 5 of the resin member 4 with the metal member 3 assumes a temperature in a range of equal to or higher than the decomposition temperature of the resin member 4 and lower than a temperature at which gas bubbles are generated in the resin member 4.

Figure 2:
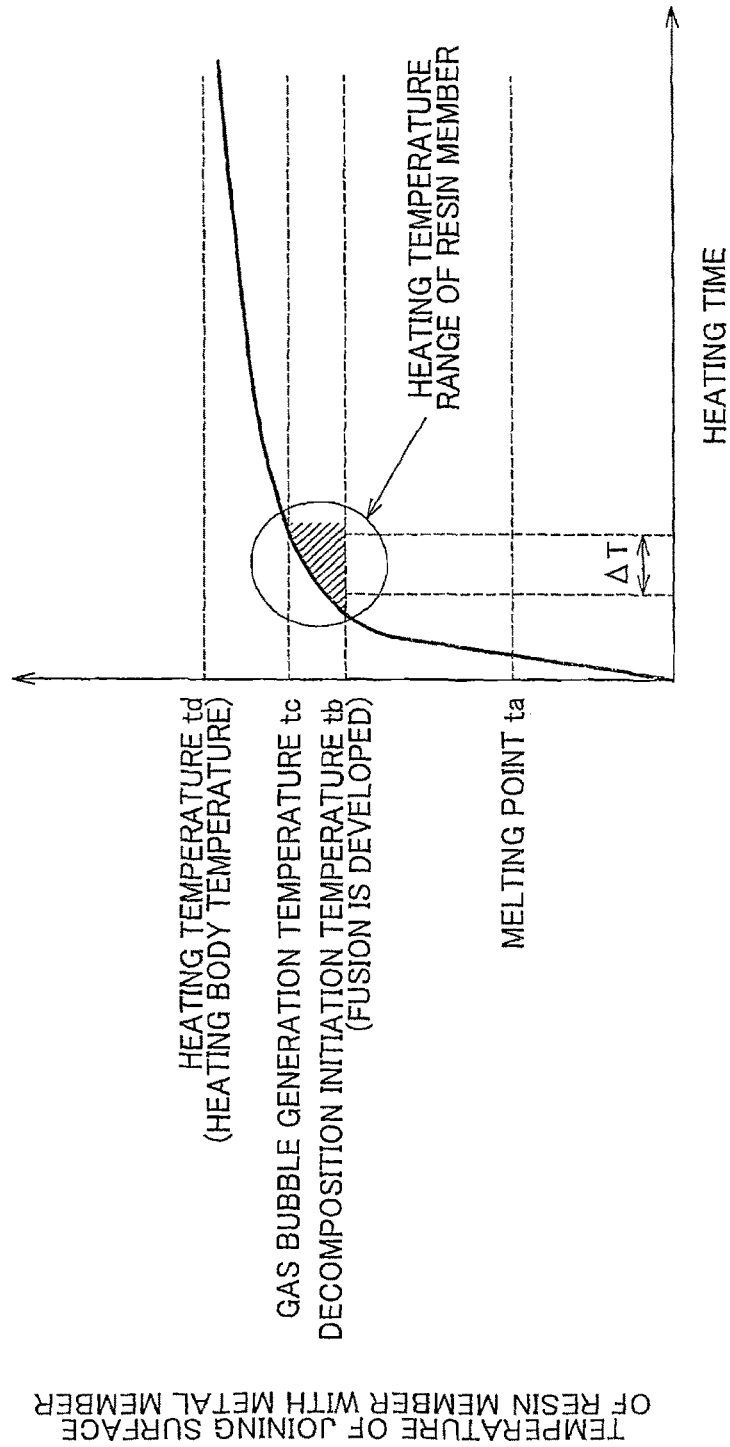
FIG. 2 illustrates the relationship between the temperature of the joining surface of the resin member and metal member and the heating time.

In this case, as shown in FIG. 2, the decomposition temperature tb of the resin member 4 is higher than the melting point ta of the resin member 4, and the temperature tc at which gas bubbles are generated in the resin member 4 is higher than the decomposition temperature tb of the resin member 4. Further, the temperature td of the heating body 1 is higher than the temperature tc at which gas bubbles are generated in the resin member 4 (in other words, (temperature td of the heating body 1)>(temperature tc at which gas bubbles are generated in the resin member 4)>(decomposition temperature tb of the resin member 4)>(melting point ta of the resin member 4)). When the resin member 4 and metal member 3 are joined, the joining of the two is performed by holding the joining interface of the resin member 4 and metal member 3, strictly speaking, the joining surface 5 of the resin member 4, at a temperature within a range of equal to or higher than the decomposition temperature of the resin member 4 and lower than the temperature at which gas bubbles are generated in the resin member 4 (this range is included in the hatched portion in FIG. 2), during a predetermined time period ΔT.

At the same time as the heating is performed with the heating body 1 in the above-described manner, a cooling body 2, which is a cooling tool, is brought into contact with the surface of the resin member 4 on the opposite side from the joining surface 5, and the surface of the resin member 4 on the opposite side from the joining surface 5 is cooled to a temperature less than the melting point of the resin member 4.

In other words, in a state in which the resin member 4 and metal member 3 are stacked, the joining of the resin member 4 and metal member 3 is performed by heating the joining surface 5 of the resin member 4 that is in contact with the joining interface with the metal member 3 to a temperature in a range of equal to or higher than the decomposition temperature of the resin member 4 and lower than the temperature at which gas bubbles are generated in the resin member 4 and cooling the surface of the resin member 4 on the opposite side from the joining surface 5 to a temperature that is lower than the melting point of the resin member 4.

In a case where the joining of the resin member 4 and metal member 3 is performed by heating the resin member 4 to the melting point ta, the two are joined only because the joining surface 5 of the resin member 4 that has reached the melting temperature and softened is deformed along the peaks and valleys of the joining surface of the metal member 3 and the anchor effect is demonstrated. By contrast, where the joining surface 5 of the resin member 4 is heated, as described hereinabove, to a temperature equal to or higher than the decomposition temperature of the resin member 4, the resin member 4 at the joining surface 5 is decomposed and fusion active groups are created at the joining surface 5. The fusion active groups that are created at the joining surface 5 of the resin member 4 are bonded by intermolecular forces to the joining surface of the metal member 3 with the resin member 4, and joining by the intermolecular forces of the fusion active groups is conducted in addition to the joining by the anchor effect on the joining interface of the resin member 4 and metal member 3, whereby a high joining strength can be obtained.

The joining is thus conducted with a joining apparatus including a heating body 1 that heats the joining interface of the resin member 4 and metal member 3 from a surface of the metal member 3 on the opposite side from the joining surface thereof with the resin member 4, and a cooling body 2 that cools the surface of the resin member 4 on the opposite side from the joining surface 5 thereof with the metal member 3 to a temperature that is lower than a melting point of the resin member 4.

In other words, because the resin member 4 and metal member 3 are joined by heating the joining surface 5 of the resin member 4 to a temperature in a range of equal to or higher than a decomposition temperature of the resin member 4 and lower than a temperature at which gas bubbles are generated in the resin member 4, neither an adhesive nor a surface treatment agent such as an acid, an alkali, and a primer treatment agent is used, a necessary and sufficient joining strength can be obtained within a short time, and environmental load in the process of joining the resin member 4 and metal member 3 can be reduced. Further, because the heating temperature of the joining surface 5 of the resin member 4 is less than a temperature at which gas bubbles are generated in the resin member 4, no gas bubbles are generated at the joining surface 5 of the resin member 4 by heating, the occurrence of cracks that originate from gas bubbles at the joining interface of the resin member 4 and metal member 3 can be prevented, and the joining strength of the resin member 4 and metal member 3 can be ensured after the resin member 4 and metal member 3 have been joined.

In addition, when the resin member 4 and metal member 3 are joined, the surface of the resin member 4 on the opposite side from the joining surface 5 is cooled to a temperature that is lower than the melting point of the resin member 4. Therefore, this surface is not deformed by heating. Because the resin member 4 can be prevented from thermal deformation during joining of the resin member 4 and metal member 3, the design property of the external surface of the joint body of the resin member 4 and metal member 3 on the side of the resin member 4 is not reduced and the product value of the joint body can be increased.

For example, various ferrous metals, stainless steel, aluminum materials (including aluminum alloys), magnesium materials (including magnesium alloys), and copper materials (including copper alloys) can be used as the material constituting the metal member 3, but this list is not limiting and other metal materials may be also used.

For example, nylon resins, polyester resins, acrylonitrile butadiene styrene (ABS) resins, and other thermoplastic resins of general use, engineering plastics of general use, super-engineering plastics, and thermoplastic elastomers can be used as the material constituting the resin member 4. A filler such as carbon fibers, glass fibers, talc, mica, kaolin, and calcium carbonate that increases the mechanical strength and the like may be admixed to the resin member 4.

In a case where the resin member 4 is constituted by a nonpolar resin that has absolutely no functional groups, the joining of the resin member 4 and metal member 3 may be conducted after subjecting the joining surface 5 of the resin member 4 to a typical dry surface treatment such as plasma treatment or corona treatment, without using a surface treatment agent such as an acid, an alkali, or a primer treatment agent. By so joining the resin member 4 and metal member 3 after performing the dry surface treatment, it is possible to introduce fusion active groups to the joining surface 5 by the surface treatment method with a low environmental load and increase the joining strength.

Further, in a case where the resin member 4 is constituted by a nonpolar resin that has absolutely no functional groups, the joining of the resin member 4 and metal member 3 is preferably conducted after roughening the joining surface of the metal member 3 with the resin member 4 by using a polishing tool such as sandpaper or forming peaks and valleys on the joining surface of the metal member 3 with the resin member 4 by electron beam processing or laser processing. Where the joining surface of the metal member 3 with the resin member 4 is thus provided with roughness or peaks and valleys, the heated resin member 4 can penetrate into the joining surface of the metal member 3 and demonstrate the anchor effect.

Further, the heating body 1 can be constituted by a high-temperature substance (solid, liquid, or gaseous) that can heat the joining surface 5 of the resin member 4 to a temperature in a range of equal to or higher than a decomposition temperature of the resin member 4 and lower than a temperature at which gas bubbles are generated in the resin member 4 and can be configured so that the heating of the joining surface 5 be performed by bringing the high-temperature substance into contact with the surface of the metal member 3 on the opposite side from the joining surface thereof with the resin member 4. Further, the heating body 1 can be constituted to heat the joining surface 5, for example, by electric resistance heating, high frequency, infrared radiation, or laser radiation, or to heat the joining surface 5 by using friction heat created by vibrations or ultrasound. These examples are not limiting and other heating means may be also used.

The cooling body 2 can be constituted by a low-temperature substance (solid, liquid, or gaseous) that can cool the surface of the resin member 4 on the opposite side from the joining surface 5 thereof to a temperature that is less than the melting point of the resin member 4, but such a configuration is not limiting and other cooling bodies may be also used.

Figure 3:
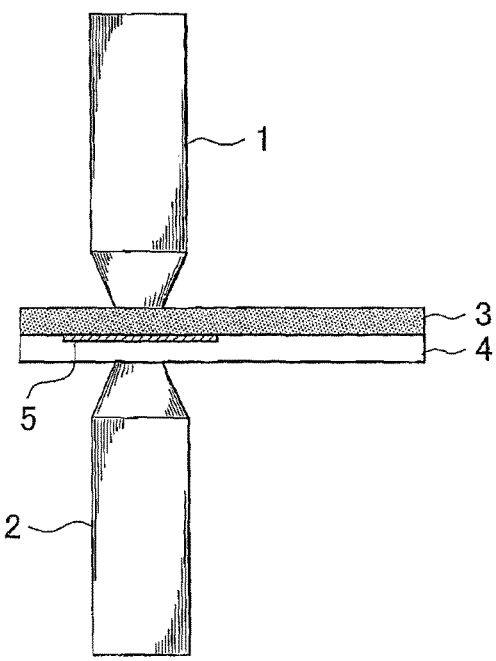
FIG. 3 is a side view of a joining apparatus in which the heating body and cooling body are formed to a shape similar to that of a gun of a spot welding machine.

An embodiment will be explained below in which, as shown in FIG. 3, the metal member 3 and resin member 4 are joined by using rod-shaped members as the heating body 1 and cooling body 2, bringing the rod-shaped heating body 1 into contact with the surface of the metal member 3 on the opposite side from the joining surface thereof with the resin member 4 to conduct heating and similarly bringing the rod-shaped cooling body 2 into contact with the surface of the resin member 4 on the opposite side from the joining surface 5 to conduct cooling.

The heating body 1 and cooling body 2 of the present embodiment are formed to a shape similar to that of a gun of a spot welding machine. More specifically, the heating body 1 and cooling body 2 are substantially cylindrical columnar members in which the end portions thereof on the side that will come into contact with the metal member 3 and resin member 4, respectively, are tapered, and these cylindrical columnar members are disposed on both sides of the metal member 3 and resin member 4 in a state in which the metal member 3 and resin member 4 are stacked. The heating body 1 is pressed against the metal member 3, the cooling body 2 is pressed against the resin member 4, and the metal member 3 and resin member 4 are pressed together in a state in which the metal member 3 and resin member 4 are stacked. As a result, the joining surface 5 of the resin member 4 is melted by heat from the heating body 1 and also decomposed, thereby joining the resin member 4 to the metal member 3. In this case, the surface of the resin member 4 that has come into contact with the cooling body 2 is cooled by the cooling body 2 and, therefore, prevented from thermal deformation. Because the heating body 1 and cooling body 2 are formed to a shape similar to that of a gun of a spot welding machine, a line and system of the spot welding machine can be used in the process of joining the metal member 3 and resin member 4.

Figure 4:
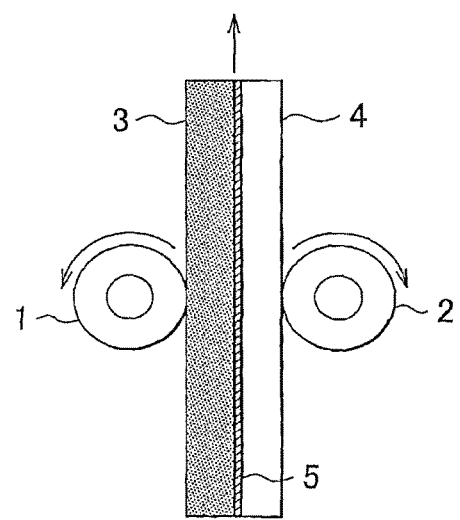
FIG. 4 is a side view of a joining apparatus in which the heating body and cooling body are configured of roller members.

Further, as shown in FIG. 4, the heating body 1 and cooling body 2 may be constituted by roller members. The heating body 1 and cooling body 2 constituted by roller member are disposed opposite each other at a distance equal to or slightly less than the thickness of the metal member 3 and resin member 4 in a stacked state thereof.

By feeding the metal member 3 and resin member 4 in a stacked state thereof between the heating body 1 and cooling body 2 disposed opposite each other and squeezing the metal member 3 and resin member 4 in a stacked state thereof by the heating body 1 and cooling body 2, the joining surface 5 of the resin member 4 is melted by the heat of the heating body 1 and decomposed, whereby the metal member 3 and resin member 4 are joined together. In this case, the surface of the resin member 4 that comes into contact with the cooling body 2 is cooled by the cooling body 2 and, therefore, prevented from thermal deformation. When the joining of the metal member 3 and resin member 4 is performed, the metal member 3 and resin member 4 that have been fed between the roll-shaped heating body 1 and cooling body 2 are successively conveyed by rotation of the heating body 1 and cooling body 2, thereby making it possible to join the metal member 3 and resin member 4 continuously, as in seam welding.

Figure 5:
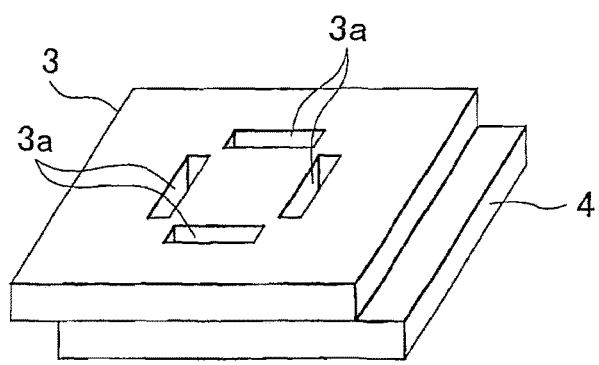
FIG. 5 is a perspective view illustrating the metal member in which slits are formed on the circumference of the joining region of the metal member and resin member.
Figure 6:
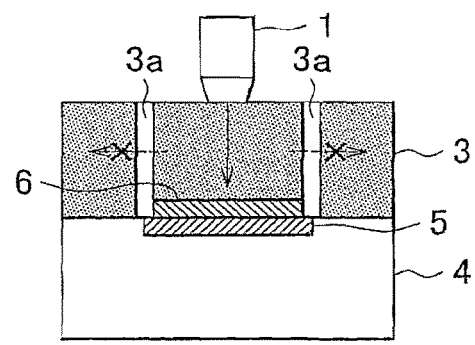
FIG. 6 is a side sectional view illustrating a heat transfer state in the metal member in which slits are formed on the circumference of the joining region of the metal member and resin member.
Figure 7:
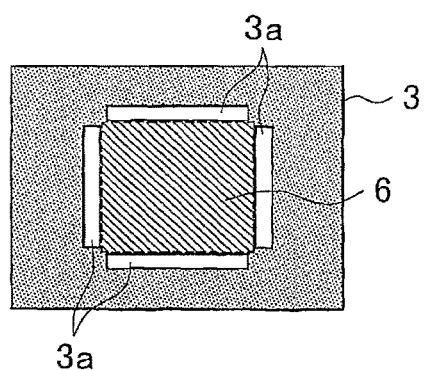
FIG. 7 is a plan view of the metal member in which slits are formed on the circumference of the joining region of the metal member and resin member.

The metal member 3 may have the following configuration. Thus, as shown in FIGS. 5 to 7, slits (cavities) 3a can be formed in the metal member 3 on the circumference of a joining region 6 of the metal member 3 and resin member 4. The slits 3a pass through the metal member 3 in the joining direction thereof to the resin member 4 and are formed in a plurality of places on the circumference of the joining region 6.

As shown in FIG. 6, portions where the slits 3a are formed in the metal member 3 are cavities. Therefore, heat transfer between two sides of the metal member 3 that sandwich the slits 3a (between a zone on the inner side of the slits 3a and zone outside the slits) is prevented. Therefore, heat supplied from the heating body 1 through the metal member 3 to the joining interface of the metal member 3 and resin member 4 can be prevented from diffusing to the outside in the plane direction of the joining region 6 and the joining region 6 can be efficiently heated. Further, because heat is not transferred to the outside of the slits 3a, the joining of the metal member 3 and resin member 4 is not conducted, thereby enabling the joining region 6 to be controlled with good accuracy.

Figure 8:
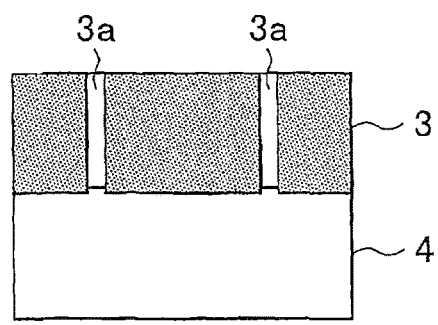
FIG. 8 is a side sectional view illustrating a state in which the softened resin member penetrated into the slits formed in the metal member.

At the joining surface 5 of the resin member 4, because the resin member 4 melts within a region somewhat wider than the joining region 6, the molten and softened resin member 4 penetrates into the slits 3a, as shown in FIG. 8. Thus, an anchor effect is produced in the portion where the resin member 4 has penetrated into the slits 3a of the metal member 3 and, therefore, the joining strength of the metal member 3 and resin member 4 after joining can be increased.

Thus, by forming the slits 3a on the circumference of the joining region 6 in the metal member 3, it is possible to inhibit heat transfer between the portions of the metal member 3 on both sides of the slits 3a, and the heat that is supplied to the joining interface of the metal member 3 and resin member 4 from the heating body 1 via the metal member 3 is prevented from diffusing to the outside in the plane direction of the joining region 6 (see FIG. 6).

As shown in FIG. 7, the slits 3a are formed so as to cover the entire region on the circumference of the joining region 6, but the ratio at which the circumference of the joining region 6 is covered may be changed appropriately. Thus, the region covered by the slits 3a can be appropriately determined correspondingly to the degree to which the diffusion of heat transferred to the joining region 6 in the plane direction is inhibited. Further, the slits 3a that are formed in the metal member 3 may be formed by cutting with a cutting tool or machining, e.g., punching, and also by processing with a laser or electron beam.

Figure 9:
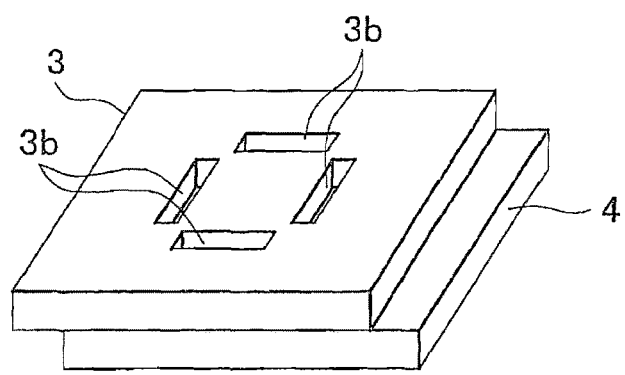
FIG. 9 is a perspective view showing a metal member in which a groove opened at the surface on the opposite side from the joining surface with the resin member is formed on the circumference of the joining region of the metal member and resin member.
Figure 10:
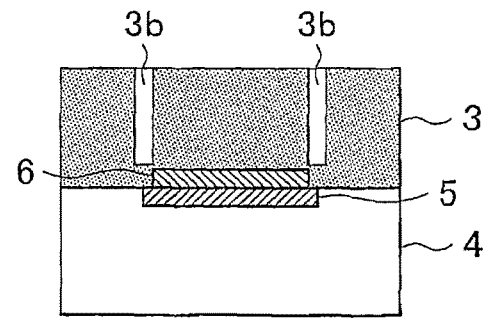
FIG. 10 is a side sectional view showing a metal member in which a groove opened at the surface on the opposite side from the joining surface with the resin member is formed on the circumference of the joining region of the metal member and resin member.

Instead of forming the above-described slits 3a in the metal member 3, it is also possible to form grooves 3b, as shown in FIGS. 9 and 10, as a structure that prevents heat transfer to the outside of the joining region 6. The grooves 3b are formed from the surface of the metal member 3 on the opposite side from the joining surface thereof with the resin member 4 toward the joining interface side. In other words, the grooves 3b are opened at the surface of the metal member 3 on the opposite side from the joining surface thereof with the resin member 4 and are closed and have a bottom portion on the joining interface side of the metal member 3 with the resin member 4.

Similarly to the slits 3a, the grooves 3b are formed in a plurality of places on the circumference of the joining region 6, and heat supplied from the heating body 1 to the joining interface of the metal member 3 and resin member 4 through the metal member 3 can be prevented from diffusing to the outside in the plane direction of the joining region 6. In a case where the grooves 3b are formed as a configuration that inhibits the diffusion of heat transferred to the joining region 6 to the outside in the plane direction, a bottom portion is formed in the grooves 3b at the joining interface side of the metal member 3 and resin member 4 and the grooves 3b do not pass as the aforementioned slits 3a through the metal member 3. Therefore, the rigidity of the metal member 3 can be increased by comparison with that in the case in which the slits 3a are formed in the metal member 3.

Figure 11:
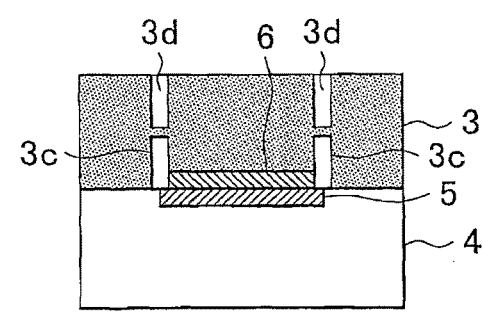
FIG. 11 is a side sectional view showing a metal member in which a groove opened at the surface on the opposite side from the joining surface with the resin member and a groove opened at the joining surface with the resin member are formed on the circumference of the joining region of the metal member and resin member.

Grooves 3c and grooves 3d can be also formed respectively on the joining interface side of the metal member 3 with the resin member 4 and on the surface side on the opposite side from the joining interface side, as shown in FIG. 11, as a structure that prevents heat transfer to the outside of the joining region 6. The grooves 3c are opened at the joining surface of the metal member 3 with the resin member 4 and have a bottom in the intermediate portion in the thickness direction of the metal member 3. The grooves 3d are opened at the surface on the opposite side from the joining interface and have a bottom in the intermediate portion in the thickness direction of the metal member 3. The grooves 3c and grooves 3d are disposed in substantially identical positions in the plane direction of the metal member 3, and the grooves 3c share bottom portions with the grooves 3d.

Further, similarly to the slits 3a, the grooves 3c and 3d are formed in a plurality of places on the circumference of the joining region 6, and heat supplied from the heating body 1 to the joining interface of the metal member 3 and resin member 4 through the metal member 3 can be prevented from diffusing to the outside in the plane direction of the joining region 6. Thus, in a case where the grooves 3c and 3d are formed as a configuration that inhibits the diffusion of heat transferred to the joining region 6 to the outside in the plane direction, a bottom portion of each pair of grooves 3c and 3d is formed between the grooves 3c and grooves 3d of the metal member 3, and the grooves 3c and 3d do not pass as the aforementioned slits 3a through the metal member 3. Therefore, the rigidity of the metal member 3 can be increased by comparison with that in the case in which the slits 3a are formed in the metal member 3. Further, the melted and softened resin member 4 penetrates into the grooves 3c, thereby generating the anchor effect in the portions where the resin member 4 has penetrated into the grooves 3c of the metal member 3.

Figure 12:
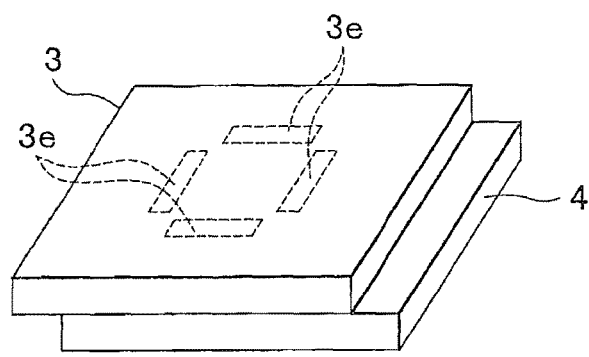
FIG. 12 is a perspective view showing a metal member in which grooves opened at the joining surface with the resin member are formed on the circumference of the joining region of the metal member and resin member.
Figure 13:
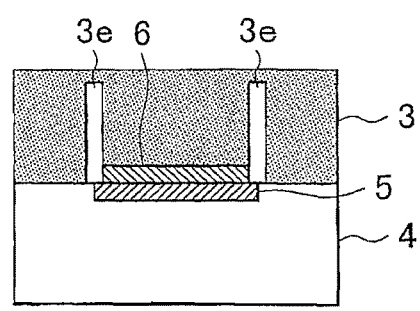
FIG. 13 is a side sectional view showing a metal member in which grooves opened at the joining surface with the resin member are formed on the circumference of the joining region of the metal member and resin member.

Grooves 3e such as shown in FIGS. 12 and 13 can be also formed as a structure that prevents heat transfer to the outside of the joining region 6. The grooves 3e are formed from the joining surface of the metal member 3 with the resin member 4 toward the surface on the opposite side from the joining surface. In other words, the grooves 3e are opened at the joining surface of the metal member 3 with the resin member 4 and are closed and have a bottom at the surface of the metal member 3 on the opposite side from the joining surface of the metal member 3 with the resin member 4.

Similarly to the slits 3a, the grooves 3e are formed in a plurality of places on the circumference of the joining region 6, and heat supplied to the joining interface of the metal member 3 and resin member 4 can be prevented from diffusing to the outside in the plane direction of the joining region 6. In a case where the grooves 3e are formed as a configuration that inhibits the diffusion of heat transferred to the joining region 6 to the outside in the plane direction, a bottom portion of the groove 3e is formed at the surface of the metal member 3 on the opposite side from the joining surface thereof with the resin member 4 and the grooves 3e do not pass, as the aforementioned slits 3a, through the metal member 3. Therefore, the rigidity of the metal member 3 can be increased by comparison with that in the case in which the slits 3a are formed in the metal member 3.

In the configuration in which the grooves 3b shown in FIGS. 9 and 10 are formed in the metal member 3, the heating body 1 shown in FIG. 3 etc. may be disposed at the surface side opposite from the joining surface side of the metal member 3 with the resin member 4, and the joining interface of the metal member 3 and resin member 4 may be heated from the side of the metal member 3. Further, in the configuration in which the grooves 3e shown in FIGS. 12 and 13 are formed in the metal member 3, the joining interface of the metal member 3 and resin member 4 may be heated from the side of the resin member 4 by using the below-described high-frequency heating apparatus 11 or laser irradiation apparatus 12. Further, in the configuration in which the slits 3a shown in FIGS. 5 to 7 and grooves 3c and 3d shown in FIG. 11 are formed in the metal member 3, the heating may be performed from the side of the metal member 3 or from the side of the resin member 4.

Figure 14:
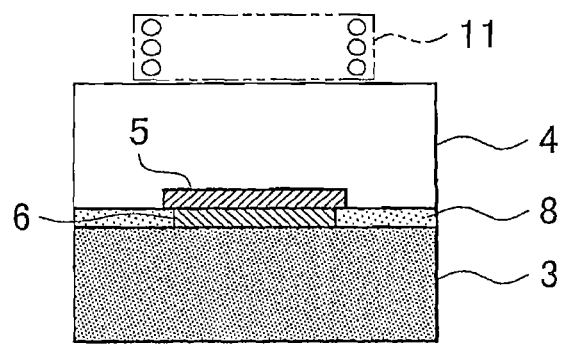
FIG. 14 is a side sectional view showing how the joining interface of the metal member and resin member is heated using a high-frequency heating apparatus as a heating body.

Further, as shown in FIG. 14, when the joining interface of the metal member 3 with the resin member 4 is heated, the high-frequency heating apparatus 11 may be used as the heating tool. When the joining interface is heated by using the high-frequency heating apparatus 11, a thin film 8 is inserted between the metal member 3 and resin member 4, and the high-frequency heating apparatus 11 is disposed on the surface side of the resin member 4 on the opposite side from the joining surface 5.

The heating method in which the thin film 8 is inserted between the metal member 3 and resin member 4 and the joining interface of the metal member 3 and resin member 4 is heated using the high-frequency heating apparatus 11 can be applied when the metal member 3 is a non-magnetic material having a low thermal conductivity and a low electric resistance, such as aluminum (Al) and copper (Cu).

In this case, a magnetic material with an electric resistance higher than that of the metal member 3, for example, a metal material such as iron (Fe), nickel (Ni), and cobalt (Co) may be used as the thin film 8. The thin film 8 may be provided by subjecting the joining surface of the metal member 3 with the resin member 4 to various processing methods, for example, electroplating, spraying, or cold spraying with the aforementioned metal materials. The metal member 3 and resin member 4 are joined together by stacking the metal member 3 provided with the thin film 8 with the resin member 4 and then high-frequency heating the thin film 8 interposed in the joining interface of the metal member 3 with the resin member 4 using the high-frequency heating apparatus 11.

Generally, in a case where the metal member 3 is constituted by a material with a high thermal conductivity and a low electric resistance, such as aluminum (Al) and copper (Cu), when the metal member 3 is heated from the surface on the side opposite from the joining surface thereof with the resin member 4 and the joining interface is heated by the heat transferred to the metal member 3, the heat transferred to the metal member 3 from the surface on the opposite side from the joining surface diffuses over a large range, the efficiency of heat input to the joining region 6 of the metal member 3 and resin member 4 is low, and the heat input range is difficult to control.

By contrast, when the thin film 8 is interposed in the joining interface of the metal member 3 and resin member 4 and the thin film 8 is directly heated by the high-frequency heating apparatus 11 disposed on the side of the resin member 4, the joining surface 5 of the resin member 4 is heated to a temperature in a range of equal to or higher than a decomposition temperature of the resin member 4 and lower than a temperature at which gas bubbles are generated in the resin member 4.

Where the thin film 8 disposed at the joining interface of the metal member 3 and resin member 4 is thus directly heated, the efficiency of heat input in the joining region 6 can be increased even when the metal member 3 is constituted by a material with a high thermal conductivity and a low electric resistance. Further, by constituting the heating body 1 by the high-frequency heating apparatus 11 and forming the heating coil of the high-frequency heating apparatus 11 to a size corresponding to the size of the joining region 6, it is possible to control the range of heat input to the joining interface of the metal member 3 and resin member 4. As a result, joining can be performed by adequately heating the joining interface of the metal member 3 and resin member 4 within a short period by a simple process and a sufficient joining strength can be obtained. In the above-described configuration, only the high-frequency heating apparatus 11 is used as the heating tool that heats the joining interface of the metal member 3 and resin member 4, but the high-frequency heating apparatus 11 may be used together with the heating body 1 and/or cooling body 2.

Figure 15:
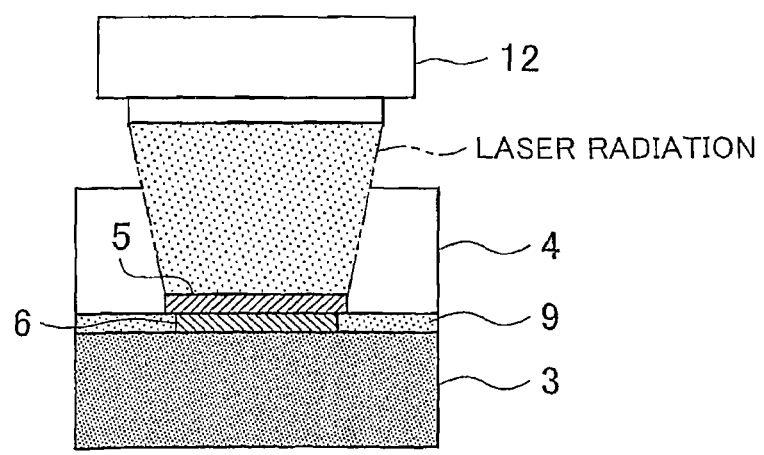
FIG. 15 is a side sectional view showing how the joining interface of the metal member and resin member is heated using laser radiation as a heating body.

Further, as shown in FIG. 15, in a case where the joining interface of the metal member 3 and resin member 4 is heated, the laser irradiation apparatus 12 can be used as the heating body 1 and heating can be performed by irradiating the joining interface with the laser radiation from the laser irradiation apparatus 12. In a case where heating is performed by irradiating the joining interface with the laser radiation from the laser irradiation apparatus 12, a thin film 9 is interposed between the metal member 3 and resin member 4 and the laser irradiation apparatus 12 is disposed at the surface on the side opposite from the side of the joining surface 5 of the resin member 4.

The heating method in which the thin film 9 is inserted between the metal member 3 and resin member 4 and the joining interface of the metal member 3 and resin member 4 is heated using laser radiation from the laser irradiation apparatus 12 can be applied when the metal member 3 is a material having a low thermal conductivity and a high reflectance of laser radiation in the infrared region, such as aluminum (Al) and copper (Cu).

In this case, the resin member 4 may be constituted by a material that can transmit the laser radiation, and a metal material with reflectance of laser radiation in the infrared region lower than that of the metal member 3, for example, iron (Fe), nickel (Ni), cobalt (Co), and zinc (Zn) may be used as the thin film 9. The thin film 9 may be provided by subjecting the joining surface of the metal member 3 with the resin member 4 to various processing methods, for example, electroplating, spraying, or cold spraying with the aforementioned metal materials.

The metal member 3 and resin member 4 are joined together by stacking the metal member 3 provided with the thin film 9 with the resin member 4 and then heating the joining interface by irradiating the thin film 9 interposed in the joining interface of the metal member 3 with the resin member 4 with laser radiation from the laser irradiation apparatus 12. The laser irradiation apparatus 12 may be constituted by an apparatus that emits infrared laser radiation, such as a yttrium aluminum garnet (YAG) laser, a semiconductor laser, or a $CO_2$ laser.

Generally, in a case where the metal member 3 is constituted by a material with a high reflectance of infrared laser radiation, such as aluminum (Al) and copper (Cu), even when the joining surface of the metal member 3 with the resin member 4 is irradiated with laser radiation, most of the radiation is reflected at the joining surface. As a result, the heating efficiency is poor and the metal member 3 and resin member 4 are difficult to join together by heating by irradiation with laser radiation.

By contrast, where the thin film 9 is interposed in the joining interface of the metal member 3 and resin member 4 and laser radiation is emitted toward the thin film 9 from the laser irradiation apparatus 12 disposed on the side of the resin member 4, the joining surface 5 of the resin member 4 is heated to a temperature in a range of equal to or higher than a decomposition temperature of the resin member 4 and lower than a temperature at which gas bubbles are generated in the resin member 4.

Where the thin film 9 disposed at the joining interface of the metal member 3 and resin member 4 is thus heated by laser radiation, the efficiency of heat input in the joining region 6 can be increased even when the metal member 3 is constituted by a material with a high reflectance of laser radiation and joining of the metal member 3 and resin member 4 can be easily realized by heating by irradiation with laser radiation. Further, by constituting the heating body 1 by the laser irradiation apparatus 12 and forming the irradiation range of laser radiation from the laser irradiation apparatus 12 to a size corresponding to the size of the joining region 6, it is possible to control the range of heat input to the joining interface of the metal member 3 and resin member 4. As a result, joining can be performed by adequately heating the joining interface of the metal member 3 and resin member 4 within a short period by a simple process and a sufficient joining strength can be obtained. In the above-described present example, only the laser irradiation apparatus 12 is used as the heating tool that heats the joining interface of the metal member 3 and resin member 4, but the laser irradiation apparatus 12 may be used together with the heating body 1 and/or cooling body 2.

The invention claimed is:
1. A joining system, comprising:
a resin;

a metal that includes at least one concavity that is formed in a zone of the metal around a joining region of the resin and the metal;

a heating tool configured to heat a joining interface of the resin and the metal from a top surface of the metal on an opposite side of the metal from a bottom joining surface of the metal in contact with the resin; and a cooling tool configured to cool a surface of the resin on an opposite side of the resin from a joining surface thereof with the metal to a temperature that is lower than a melting point of the resin.

2. The joining system according to claim 1, wherein the heating tool is configured to heat the joining interface of the resin and the metal to a temperature in a range of equal to or higher than a decomposition temperature of the resin and lower than a temperature at which gas bubbles are generated in the resin.

3. The joining system according to claim 1, wherein each of the at least one concavity is a slit that penetrates through the metal and that is formed in a zone of the metal around a joining region of the resin and the metal.

4. The joining system according to claim 3, wherein each of the at least one slit penetrates through the metal from the top surface of the metal to the bottom surface of the metal.

* * * * *